United States Patent [19]

Graul

[11] 3,784,967
[45] Jan. 8, 1974

[54] SEISMIC RECORD PROCESSING METHOD
[75] Inventor: John Michael Graul, Houston, Tex.
[73] Assignee: Chevron Research Company, San Francisco, Calif.
[22] Filed: July 2, 1971
[21] Appl. No.: 163,526

Related U.S. Application Data
[63] Continuation-in-part of Ser. No. 797,844, Feb. 10, 1969, abandoned.

[52] U.S. Cl. .................. 340/15.5 TC, 340/15.5 TD
[51] Int. Cl. ............................................. G01v 1/32
[58] Field of Search .............. 340/15.5 TC, 15.5 TD

[56] References Cited
UNITED STATES PATENTS
3,346,840  10/1967  Lara ............................... 340/15.5 R
3,149,302  9/1964   Klein et al. ........................ 340/15.5
3,273,114  9/1966   Stephenson et al. ................ 340/15.5

Primary Examiner—Benjamin A. Borchelt
Assistant Examiner—N. Moskowitz
Attorney—J. A. Buchanan, Jr., G. F. Magdeburger, R. L. Freeland, Jr. and H. D. Messner

[57] ABSTRACT

A seismic record processing method is described wherein groups of traces comprising the original record are sonogrammed and events selected to identify, within each group of sonogram traces, coherent energy at specified record moveouts wherein the aforementioned coherencies are advantageously enhanced; after the picked sonogram traces are again sonogrammed to produce traces of a simulated record, the simulated traces are combined ("mixed"), with corresponding traces of the original record whereby both trace-to-trace coherency and across-the-section continuity of the resulting final display, are surprisingly improved.

11 Claims, 14 Drawing Figures

= INCLUSION OF POSITIVE, NEGATIVE AND FLAT DIPS.

= INCLUSION OF POSITIVE DIP ONLY.

= INCLUSION OF POSITIVE AND AMPLITUDE INVERTED NEGATIVE DIPS ONLY.

3,784,967

SEISMIC RECORD PROCESSING METHOD

CROSS REFERENCE TO RELATED APPLICATIONS

This application is a continuation-in-part of application Ser. No. 797,844, filed Feb. 10, 1969, for "Seismic Record Processing Method", which is now abandoned.

FIELD OF THE INVENTION

This invention relates to processing of data in a plurality of traces containing continuing signals having amplitude variations with time, and more particularly to the processing of seismic data constituting a multitrace seismic record. In a principal aspect, the present invention is concerned with improving a known method of processing multitrace seismic records, the known method basically involving a two-step process: The algebraic summation of the amplitude representations, with time, of a group of seismic traces as a function of record moveout across that group of traces (called sonogramming) followed by a second sonogramming of the sonogram traces to form an inverse sonogram record (simulated seismic record). That these process steps are known to those skilled in the art is clear from Pat. No. 3,346,840, issued Oct. 10, 1967, for "Double Sonogramming for Seismic Record Improvement", Rolando Lara assigned to the assignee of this application.

DEFINITIONS

In this specification, i. the term "sonogramming" is a word which has become known to the seismologist and is used hereinafter in a manner that is familiar to those who process geophysical data in the form of seismic records. The term is derived from the sonograph recording and trace treatment process originally disclosed by Frank Reiber in "A New Reflection System with Controlled Directional Sensitivity," *Geophysics*, Vol. I, No. 1, January 1936, as well as that equipment shown and described in *Exploration Geophysics* at pp. 825–835, J. J. Jakosky, 1950, Trija Publishing Company, Los Angeles, Calif., and can be described as summation of amplitude excursions of a group of seismic traces as a function of record movement;

ii. the term "simulated seismic record" is used to designate a record of seismic traces in which dimensional characteristics thereof, viz., amplitude-versus-horizontal coordinate (i.e., distance)-and-time, are identical with the dimensions of the original seismic record produced as a direct recording of the output signals of an array of seismic detectors in the field, but in which at least one trace thereof has gone through at least a transformation, modification, and inverse transformation of dimensions. In the case at hand, the original record (dimensions: amplitude-versus-horizontal coordinate-and-time) is transformed initially into a sonogram with dimensions of amplitude-versus-moveout-and-time. After modification (picking and trace amplification), the sonogram is transformed back to the amplitude-time-distance domain, thus producing a simulated seismic record.

Improvement in the aforementioned data processing method in accordance with the present invention, is achieved, at least in part, because:

1. Selections ("picking") of seismic events within the sonogram traces occur before these traces are inversely sonogrammed so that events which could have been hidden by incoherent noise within the original records can be more easily identified;

2. After each sonogram trace is formed and picked but before the inverse sonogram traces are created, selections of specified sonogram traces at particular record moveouts and time (advantageously determined prior to the beginning of the process) are automatically undertaken so as to allow emphasis of certain signal information. The result is that seismic events which possibly could have been hidden by coherent noise within the original record, can now be more easily identified, and;

3. After the improved inverse sonogram traces are formed, the original seismogram traces are mixed in correct time synchronism with the improved inverse sonogram traces to form a final display whereby, as a result of a combination of the effects of steps (1)-(3), there is provided improved across-the-display continuity, as well as increased trace-to-trace coherency.

BACKGROUND OF THE INVENTION

Modern procedure for collecting seismic data involves the initiation of a seismic disturbance at the earth's surface and the detection at a plurality of surface geophones of the seismic energy reflected by subsurface horizons. The geophones are positioned in an array, usually along a straight line, and the seismic disturbance is initiated at a known position with respect to the geophone array. The energy reflected from subsurface reflectors is detected by the surface geophones where the earth's movement is converted to electrical signals and then recorded with respect to time as a plurality of traces having variations in amplitude on a multitrace seismic record. The modern seismic record is usually a reproducible record and may be in the form of analog or digital magnetic tape record of the amplitude variations. For the purpose of the present invention the seismic record referred to herein should be understood to be a reproducible record fully corrected for geophone vertical alignment (static corrections) and for source-to-geophone offset (dynamic corrections).

Individual traces of the seismic record contain signal and noise, and both may appear in the form of amplitude variations along the traces. The desired signal is that portion of the amplitude variations attributable to the reflected seismic energy; however, the signal and some of the noise is caused by movements of the earth's surface derived from the seismic disturbance. Noise may also result from movements of the earth's surface having no relationship to the initiated seismic disturbance, as well as from non-motion noise occurring in the detection, amplification and recording of the seismic traces. Noise may be considered to occur in two modes, random and coherent. The usual distinction between the signal and the random noise on the multitrace seismic record is that the signal appears to be coherent from trace to trace while noise tends to be random, or incoherent (zero correlation expectation). In the case of coherent noise, the distinction is more esoteric and usually placed on an empirical basis. Among the examples of coherent noise are the following: amplitude variations within the record which relate to undesired diffractional energy propagation within the subsurface formation unrelated to the vertical section ("profile") of interest; multiply reflected signals ("multiples"); primary signals from subsurface reflectors laterally offset from the aforementioned profile of interest (not in the "seam of the section"); source generated surface waves; coherent waveforms caused by nonseismic sources (e.g., automobiles near the line of profiling). Coherent noise may contribute (to more than a moderate degree) to misinterpretation of conventional records. This is because coherent noise may interfere with (and thus may mask) valid signal energy, and the same noise may end up being mistaken for true reflection information in the final display.

Although recent developments have permitted the use (either in analog or digital format) of new data filtering and modifying processes, their final displays may still be of rather poor quality, as far as structural interpretation is concerned. This is especially true for displays of data collected in "difficult" seismic record regions. A list of probably reasons for the poor interpretive quality includes:

i. coherent noise in the final display masking valid signals or being mistaken for true reflection information;

ii. poor trace-to-trace coherency of events of interest; and iii. inadequate across-the-display continuity of the events of interest.

OBJECT OF THE INVENTION

Accordingly, an object of the present invention is the provision of a novel processing method for seismic information for improvement of both the trace-to-trace coherency as well as the across-the-section continuity of a simulated seismic record, such processes tending to exclude, to some extent, undesired coherent and random noise in the original traces and/or to increase the amplitude of true primary signals in the traces in relation to the noise elements.

SUMMARY OF THE INVENTION

In accordance with the present invention, a composite seismic section consisting of a plurality of traces having improved trace-to-trace coherency as well as enhanced across-the-section continuity, is provided after the original seismic section has been processed to provide a simulated seismic record by the steps of:

1. sonogramming traces of the original seismic section to produce sonogram traces, 2. picking the sonogram traces to identify desirable characteristics along each sonogram trace that represents, at least in part, both seismic events of interest (signal), and those coherent noise events with which my invention will subsequently deal, 3. mapping the selected energy in the form of amplitude variations onto a simulated seismic section according to its moveout, time, and trace positions, and with applied amplification (or attenuation) factors corresponding to a desired level of emphasis or de-emphasis, and 4. mixing the original traces of the original seismic section with corresponding traces (by trace position), resulting from step 3, to form the improved composite seismic section of the present invention.

In accordance with the procedures of this invention, after the sonogram record has been picked and then again sonogrammed and each of the resulting traces have been combined with the corresponding trace of the original seismic record, the result is a new trace containing not only the amplitude variations of the original trace, but also includes those variations modified in accordance with the amplitude variations along the trace of the simulated seismic record. Extent and duration of the modifying process vary with mixing and selection criteria introduced prior to the initiation of the process. For example, the mixing of the original traces with corresponding simulated seismic traces can vary the mixed proportions in accordance with a predetermined function of time, so as to provide improved interpretative characteristics in the final display. Further, one or more of the sonogram traces at a specified record moveout can be entirely omitted from the remainder of the processing steps to allow "de-emphasis", of selected information within the traces. Still further, since the simulated trace record can also be produced so as to amplitude invert record correlations that might represent undesired coherencies, the present invention can produce further desired modifications which cause virtually complete elimination of such coherencies in the final display. The result of the aforementioned combinations of simulated and conventional traces is a production of a more acceptable seismic record, and the combining of records processed produces a more acceptable seismic section. The acceptability of these improved records and sections is not merely arbitrary; it can be shown that there is greater continuity between the combined traces, records and sections than was present in traces, records or sections of the prior art.

Further objects and features of the present invention will be readily apparent to those skilled in the art from the specification and appended drawings illustrating a preferred embodiment wherein:

DESCRIPTION OF THE DRAWINGS

FIG. 9b is a schematic representation of a multirecord simulated section produced from FIG. 9a.

DETAILED DESCRIPTION OF THE INVENTION

Figure 1:
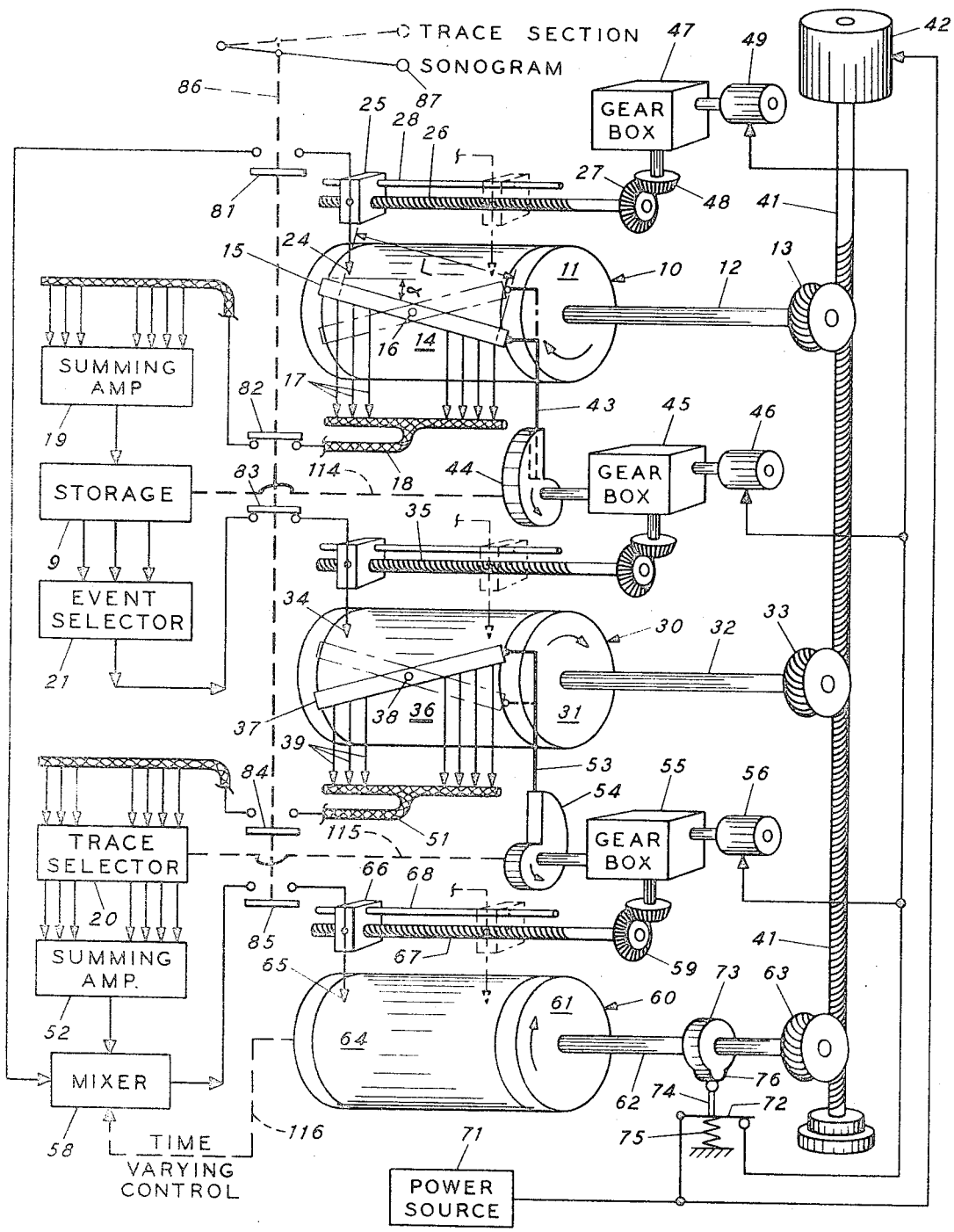
FIG. 1 is a schematic illustration of one form of apparatus capable of performing the method of the present invention.

The operating concept of an apparatus for performing the seismic record processing method of the present invention can be best understood by referring first to FIG. 1. In that figure three separate magnetic tape recording and playback systems are illustrated at 10, 30 and 60. While the method of the present invention could be performed with less apparatus than shown herein by physically moving records back and forth between recording systems, the process is more easily described and understood by referring to the three systems as shown. It should be understood that other combinations of the apparatus, as well as other types of recording, reproducing and data processing systems are contemplated. An example of other such combinations would be a properly programmed digital computer.

The first magnetic recording system 10 constitutes a drum 11 supported on a rotatable drive shaft 12 driven by a suitable mechanism such as gear 13, worm shaft 41 and motor 42. Actual record processing in accordance with the present invention will require careful speed control for rotation of the systems 10, 30 and 60, as well as synchronization between the rotation of the record drums and the movements of pickup heads within each system. The drum 11 is adapted with conventional apparatus, not shown, for securing a seismic record in the form of a magnetic tape 14 to the periphery of the drum. A plurality of magnetic pickup heads, not individually illustrated, are carried by a pivotally mounted head moving bar 15. The head moving bar 15 is here illustrated with a pivot at its center 16 so as to be positioned in different transverse alignments with respect to the periphery of the drum and the longitudinal axis of the seismic record mounted thereon. The pivot is outside of the drum so that the drum may be rotated with respect to the bar and the pickup heads. The individual pickup heads are aligned with traces on the seismic record and reproduce the electrical signals represented on the traces with differential time adjustments between traces caused by the alignment of head moving bar 15 with respect to the record. Since each trace is associated with a selected detector field coordinate (usually relative to a base point), the dimensional characteristics of the traces are amplitude-versus-time-and-horizontal coordinate.

The pivotally mounted head moving bar 15 is moved about its pivot 16 by movement of a mechanical push rod 43 following a cam 44. The cam is rotated through gear box 45 from motor 46, and the cam and gear reduction are appropriately designed to provide for a total movement of head moving bar 15 between its pivotal limits in a predetermined number of steps. After each single revolution of the drum 11, motor 46 is energized by apparatus to be described, to cause one step of movement of the cam 44. During each stop of the bar 15 per single revolution of the drum 11 it is evident that the group of traces thus generated can be identified by a horizontal coordinate corresponding to the horizontal position of pivot point 16 of FIG. 1.

It should be understood that different schemes may be employed to provide individual control for the movement of each of the reproducing heads and also that cams of a different contour may be employed to produce stepped head movement in different increments. For example, in apparatus actually used to carry out the method of this invention, the magnetic pickup heads are not mounted on a simple bar but instead are mounted on separate members that are capable of individual circumferential movements around the drum. The bar-type mechanism is illustrated here for didactic clarity.

The signals recorded on individual traces of the magnetic tape 14 are also reproducible by a single-trace pickup head 24 mounted on a threaded block 25 positioned by rotation of worm 26. The threaded block 25 is guided by a fixed rod 28 to prevent its rotation about worm 26. The worm 26 is driven from a gear box 47 by a gear 48 and its engagement with gear 27. Energization of motor 49 causes rotation of gear 48 and the consequent movement of the pickup head 24 parallel to the axis of the drum 11. With each energization, the pickup head 24 is moved one trace transversely across the record.

The signals from summing amplifier 19 are passed to storage device 9 and thence to an event selector 21. Sophisticated analysis of directional seismic traces to detect seismic events requires more than one trace in simultaneous processing. Hence, storage device 9 is positioned between the amplifier 19 and selector 21 as depicted in FIG. 1. However, as disclosed in the parent of the present application, i.e., Ser. No. 797,844, a single summed trace can be event-selected. Such selection can involve, say, a square-law detector as the event selecting device. The sum traces are, in effect, first rectified and then averaged. For a description of this early method of picking, see the following technical paper: "The Application of Correlation Techniques to Acoustic Receiving Systems", James J. Faran, Jr. and Robert Hills, Jr., Harvard Acoustics Research Laboratory Technical Memorandum No. 28, Nov. 1, 1952. It is evident that such a selection procedure does not require the use of storage device 9 of FIG. 1 since a single input to the square-law detector is all that is required in order to obtain desired selection goals.

In U.S. Pat. No. 3,149,302, Klein et al., for "Informational Selection Programmer Employing Relative Amplitude, Absolute Amplitude and Time Coherence" issued Sept. 15, 1964, and assigned to the assignee of the present application, a method and apparatus for forming the comparative analysis of directional seismic traces for the selection of information to be used, has been disclosed. In that patent, systems are disclosed which compare a group of three adjacent directional traces for selectional purpose to detect seismic events within the central one of the three traces. Since event selector 21 functions in accordance with predetermined selection codes (or sets of rules) to identify certain amplitude excursions along each of the sum traces from the storage device 9 that are believed to represent coherent energy on the original seismic record that, in turn, represent probable reflections, the output from the selector 21 is a single trace whose amplitude or intensity is modified according to the picking selection code of the type described in U.S. Pat. No. 3,149,302. That patent further discloses that the use of three traces is arbitrary and the number of traces selected for the comparison will be determined by the sensitivity pattern of the geophone array and by the time delay (moveout) employed in extracting the directional seismic information from the locational (original) traces. However, it should be noted that it is not necessary to produce and store all of the directional traces before the selection process occurs, since only a limited few are actually used at any one time in the selection of events. Pat. No. 3,149,303, Klein et al., for "Seismic Cross Section Plotter" issued Sept. 15, 1964, discloses a temporary storage device useful in accomplishing the temporary storage of directional seismic traces. As described in that patent, a typical storage device includes a multiposition relay connected to a multichannel recording means. As each sonogram trace is produced from the original traces, that trace is applied through the multiposition relay to the recording means. Each channel of the recording medium will have the necessary elements to record, reproduce and erase the signals within itself. Referring again to FIG. 1, if such a multiposition relay is used, it can be stepped through each of its positions using, say, linkage 114 connected as illustrated in FIG. 1 so that in each of its successive positions the directional seismic trace produced from a summing bar 15 will be applied to a different one of the separate channels of the recording means.

Attention should also be directed to the fact that other event selectors could be utilized in the present invention, as for example that event selector described in U.S. Pat. No. 3,273,114, Stephenson et al., for "Ergodic Signal Picking", issued Sept. 13, 1966 and assinged to the assignee of the present invention. In that patent, there is described a method and apparatus for performing the selection of seismic events based on a statistical deviation of instantaneous measured characteristics from measured normalized average characteristics with respect to the original record. However, if such a picking method were used, the apparatus of FIG. 1 would be somewhat modified. Likewise, combinations of the aforementioned devices and methods may also be useful in carrying out the present invention. In this regard, since the tailoring of steps to achieve specified selection goals may now be of importance in the processing of seismic data, a method of having particular utility in the operating modes of the present invention will now be described. It will become evident from the discussion which follows that the method is, in essence, time averaging event detection and incorporates features of the event selectors and methods referenced above. Briefly, in this method, for each sonogram trace to be picked, a corresponding "control trace" is generated, whose amplitude values as a function of time may be only zero of unity. Multiplication of each sonogram trace by its corresponding control trace emphasizes those portions of the sonogram trace considered to contain seismically meaningful events.

Now in more detail, the generation of the control trace involves several steps, which may be thought of as being in two separate, parallel groups of steps: (i) the first group of steps consists of individually squaring and integrating each of the traces of the original seismic record to produce a set of individual traces which represent the power in the original individual traces. Then the power traces are sonogrammed to produce a set of "sonogram average power traces", one for each moveout used in the sonogramming process; and (ii) the second group of steps consists of first, individually squaring and integrating the regular sonogram traces to obtain individual "power traces of a sonogram". Then the amplitude values on these traces are divided, point-by-point, by the amplitude values on the previously derived, corresponding, sonogram average power traces. The result at this point is a set of "normalized power traces", one trace for each trace of the starting sonogram. The normalized traces are then scanned to find portions whose values are above a threshold number, e.g., 0.20, and for each of the normalized traces, a control trace is then generated whose amplitude value is zero when that of the normalized power trace is less than the threshold value, and whose amplitude value is unity when that of the normalized power trace is greater than the threshold value. Finally, each of the starting sonogram traces is multiplied, point-by-point, by its corresponding control trace, to give a corresponding picked sonogram trace, whose amplitude values are those of the starting sonogram trace in the time intervals when the control trace was unity, and whose amplitude values are zeroed out when the control trace was zero.

The preceding steps to obtain picked sonogram traces by control trace multiplication may be varied in many possible ways. Variations practiced by the assignee of the present invention include scanning the normalized power traces three-at-a-time, fitting parabolas to the coincident peaks, and comparing the peak values of the fitted parabolas to the threshold value. Aside from the obvious benefit here of using again the property of sonogram trace-to-trace coherence, another benefit is the computable value of the moveout ordinate of the actual peak of the fitted parabola, which may, and usually does, lie between two of the previously chosen moveout values of the sonogram traces.

From event selector 21, the picked signals are passed through switchable contacts 83, to be described hereinafter, to recording system 30. System 30 constitutes a rotatable drum 31 mounted on shaft 32 driven by gear 33 through engagement with worm 41 rotated by motor 42. The recording system 30 is provided with a single recording head 34 to record the signals supplied from event selector 21. Recording head 34 is positioned parallel to the axis of the drum in accordance with rotation of worm 35 driven from drive motor 46 by mechanism similar to that employed for pickup head 24 in system 10 so that head 34 is moved step-by-step transversely across the surface of drum 31. In each of its positions, recording head 34 records onto the magnetic tape 36 on the recording system 30 a picked sonogram trace derived from the record 14 in recording system 10.

The recording system 30 further includes a plurality of pickup heads, not individually illustrated, carried on a pivotally mounted head moving bar 37 illustrated with a pivot at its center 38. Head moving bar 37 is mounted and movable similarly to bar 15 of system 10. The individual pickup heads reproduce the electrical signals represented on the traces of the record recorded on tape 36 and these signals are transmitted as individual signals through conductors 39 and cable 51 to a selector 20 and then to a summing amplifier 52. Switchable contacts 84, to be described, are provided between the recording system 30 and the selector 20.

The pivotally mounted head moving bar 37 is moved about its pivot 38 by movement of a mechanical push rod 53 following a cam 54. The cam is rotated through a gear box 55 from motor 56 and is appropriately designed to provide for a total movement of the head moving bar 37 between its pivotal limits in a predetermined number of setps. After each single revolution of the drum 31, motor 47 is energized to cause one step of movement of the cam 54.

When head moving bar 15 is aligned as illustrated in heavy line in FIG. 1, attention should be directed to the fact that the sensitivity of the collectively moving heads will be most representative to seismic signals having a record moveout along the time axis of the record proportional to angle $\alpha$, where $\alpha$ is the angle between bar 15 and a horizontal line in the plane of tape 14. If the distance L represents the included length of the bar 15 intersecting imaginary verticals emanating from the surface of tape 14 passing through the most-left and the most-right traces of the record 36 (or for that matter any N traces), then the time moveout along the record, $\Delta t$, is equal to (Sin $\alpha$) L. Since summation angle $\alpha$ is also proportional to the dip of the strata (assuming such strata truly exists in the formation being surveyed), the resulting summed signals from bar 15 aligned in the position depicted in heavy line in FIG. 1, thus can be said to represent the largest and most negative directional trace of the process, and for reasons set forth in the specification, supra, will be designated the (−60) millisecond trace. The (−60) millisecond trace will be recorded as the left-most trace on record 36, as depicted in FIG. 1. Similarly, when the moving bar 15 is positioned as illustrated in phantom line in FIG. 1, the heads will be most responsive to directional signals having a record moveout which is the largest and most positive value of the process. As the summed signals are recorded on record 36, such summed signals will be recorded at the right-most trace and for reasons of clarification to be discussed below, it is designated (+60) millisecond trace. Between the aforementioned left- and right-most sonogram traces on record 36 there will be recorded additional traces representing proportional moveout magnitudes between the left-most and right-most traces with the zero moveout trace usually being centered therebetween. The number of additional traces can range between any convenient number, say 10 to 30 traces, with about 20 being preferred.

By convention in the sonogram process, the summation trace signals are recorded on record 36 at a longitudinal position along the trace corresponding to the time position of the center or pivot point of summation angle or, in the case illustrated, the center of bar 15. An event appearing first in time on the trace on the left of record 14 and later on the trace to the right, would appear on a trace on record 36 to the left of center with the event being recorded at a longitudinal position along the record determined by the position of the pivot point of the head moving bar 15 with respect to the longitudinal or time axis of record 14.

In the continuing process it is necessary that the regeneration of events along separate traces of the simulated record be appropriately aligned with time on the traces of the original record. Each of the traces previously recorded on record 36 by recording head 34 will be reproduced by a separate pickup head on head moving bar 37 during each revolution of the drum 31. Events on sonogram traces left of center on record 36 must appear at a lesser longitudinal position on the simulated record than they do on the sonogram record. To accomplish that alignment, the sonogram record is sonogrammed in reverse order as compared to the order of its production. In the apparatus here illustrated cam 54 is constructed with a reverse spiral contour as compared to cam 44 and head moving bar 37 starts with a slope facing the right side of the record as compared to the left-facing starting slope for head moving bar 15.

Trace selector 20 is for the purpose of including, or excluding, any individual sonogram trace from the sonogram record 36. In this regard, inclusion, of course, means the gating of attendant circuitry within selector 20 to cause inclusion of the amplitude representations of the sonogram trace, those amplitude representations having either a positive or negative sign (with regard to the latter distinction, amplitudes having negative signs bring about amplitude inversion of the trace). Exclusion means each individual sonogram trace is prevented from passage through the selector 20 and, accordingly, is prevented from further processing in accordance with the procedures of the present invention.

Selector 20 may be thought of as a set of transformers, one for each trace to be fed into selector 20. Since it is usual to process traces in groups of 24, selector 20 could consist of 24 separate transformers in parallel. With the secondary of each transformer center-tapped to ground, connection to one end of a secondary would give a voltage proportional to the input signal, and of the same sign, while connection to the other end of the secondary would give a similar voltage, but of the opposite sign. Non-connection to ether end (switch means inactivated), of course would simply exclude the trace in question. In actual practice, these conceptual transformers are replaced by pairs of operational amplifiers capable of giving, for each input channel, a pair of proportional outputs, one positive and the other negative, and also capable, of course, of giving zero output, when switched off.

Attention should now be directed to the fact that the decision whether or not to include or exclude a particular sonogram trace or group of traces at the selector 20 is not based on criteria developed after the processing of the data has begun. The criteria are developed and implemented by a seismologist prior to the initial sonogramming step. Once a particular decision has been made by the seismologist, the apparatus of FIG. 1 carries out his commands using conventional circuitry such as a series of switches whose actuation is scheduled prior to the initial processing steps. For example, mechanical linkage 115 could be a series of cams attached to a common shaft through gear box 55, the cams coming into effect as a function of the angle of rotation of that shaft. It should be pointed out, however, that linkage 115 is depicted as a mechanical unit for didactic simplicity only. It indicates that the same mechanism which determines the settings of head moving bar 37 should also determine the switch settings of the switch means within selector 20. In practice, both the head moving bar 37 and the switch means of trace selector 20 can be actuated by stepping switches which step as a function of drum rotation, to provide the required informational selection.

The traces passed through selector 20 are supplied to summing amplifier 52 where they are combined to produce a single output trace for each revolution of the drum 31. The summed signal output from summing amplifier 52 constitutes individual seismic trace-like signals.

These signals are then supplied as one input to a mixer 58. A second input to that mixer is the signal reproduced by the pickup head 24 of recording system 10 and passed through switchable contacts 81 to be described later. These two input signals are combined in mixer 58 and supplied as a recordable signal to recording system 60.

The mixer 58 in FIG. 1 may have several types of configurations, such as variable gain amplifier means whose relative gain of two input signals can be varied as a function of time, or more simply, it could be a pair of potentiometers controlled by a common shaft whose rotation decreases the proportion of one of the input quantities at the output, and, of course, increases the proportion of the other input quantity. The potentiometers may be wound so that the total output always bears a constant ratio to the total input. The common shaft of the potentiometers may be rotated, through linkage 116 such as a rack and pinion gear and a cam, the rotation being in proportion to the radial displacement on the cam, which in turn can be rotated by, or physically attached to shaft 62, of drum 61. Angular variation in the cam radius is such as to produce the desired time variation of the relative mixing proportion of the original traces and the simulated traces. To those skilled in the art of analog data processing, several types of more sophisticated electromechanical, and electronic arrangements for varying the mixing proportion with time will suggest themselves, each type having its advantages and dis-advantages.

Recording system 60 constitutes a drum 61 supported on a rotatable shaft 62 driven by suitable mechanism such as gear 63, worm shaft 41 and motor 42. The drum 61 is adapted with apparatus, not shown, for securing a recording medium in the form of a magnetic tape 64 to the periphery of the drum. A single recording head 65, connected to the mixer 58 through switchable contacts 85, to be described later, cooperates with the tape 64 to produce a recorded magnetic record. The single recording head 65 is mounted on a threaded block 66 positioned by rotation of worm 67. The threaded block is guided by fixed rod 68 to prevent its rotation. Energization of motor 56 causes rotation of gear 59 and the consequent movement of the recording head 65 parallel to the axis of the drum 61.

The pitch of the worms 26, 35 and 67 and the contour of the cams 44 and 54 are so related that the heads 24, 34 and 65 are moved step-by-step from one side to the other of their respective drums while the cams make one complete revolution to move the head moving bars 15 and 37 from one limiting position to another. Stepping switches likewise can aid in providing appropriate synchronization of the system, as previously mentioned.

Energization of the system illustrated in FIG. 1 is provided from a power source 71 through switch contacts 72 to motor 42 and the motors 49, 46 and 56. Cam 73 on shaft 62 pushes on rod 74, against the bias of spring 75, to close the contacts of switch 72. The eccentric projection 76 of the cam 73 causes contacts 72 to be closed only during the part of the revolution in which the magnetic tapes on drums 11, 31 and 61 are in such a position that their respective heads 24, 34 and 65 are in the peripheral gap between the beginning and the end of the tapes. During the relatively short time that these heads are in that gap, and therefore not transmitting useful information, the heads are repositioned axially along their respective drums while the drums 11, 31, and 61 continue to revolve at constant speed.

Individual switching contacts are shown in the conductors between head 24 and mixer 58, in cable 18 between conductors 17 and summing amplifier 19, between event selector 21 and recording head 34, in cable 51 between conductors 39 and trace selector 20, and between mixer 58 and recording head 65. The individual switchable contactors 81, 82, 83, 84 and 85 are collectively operated by a rod 86 and a master control rod 87. It should be apparent that when contactors 81, 84 and 85 are open contactors 82 and 83 are closed, and that when contactors 82 and 83 are open, contactors 81, 84 and 85 are closed. In the "down" position (SONOGRAM), the first sonogramming process will be performed and in the "up" position (TRACE SECTION) the second sonogramming and record mixing will be performed.

The operation of the mechanism in performing the method of the present invention should be readily apparent from the foregoing description of the apparatus schematically illustrated in FIG. 1. With a corrected seismatic record positioned on the periphery of drum 11 of record system 10 and a blank recording tape placed on the periphery of drum 31 of the recording system 30 and with master control rod 87 in the illustrated solid line position, the pivotally mounted head moving bar 15 beginning in the illustrated solid line position, and the recording head 34 beginning in the illustrated solid line position, the record of recording system 10 may be sonogrammed with each drum revolution to produce individual traces of an event selected sonogram record on the recording tape 36. After each individual trace is completed, head moving bar 15 with pickup heads will be shifted for the production of the next trace until the full sonogram record has been completed.

After the complete sonogram record has been produced, the master control rod 87 will be moved to the position shown in dotted lines and the recording systems energized a second time. In this position the first trace on the original record 14 on the recording system 10 will be reproduced while at the same time the first trace of the simulated trace record is produced in recording system 30. The signals along these two traces are combined in the mixer 58 and the combined signal is recorded as the first trace on a blank magnetic tape on the periphery of the drum 61 of recording system 60. This process is continued until each individual trace of the original record 14 has been reproduced and combined with a corresponding trace of the simulated record of recording system 30. When all of these combined traces have been produced, in sequence, the record now recorded on the tape 64 of the recording system 60 will be the new improved combined seismic record.

It should be apparent that a number of different mixing operations can be accomplished with the apparatus of FIG. 1 and that combinations of adjustments of certain of the elements of the apparatus may be employed to effect different mixing operations. Both the selector 20 and the mixer 58 may be controllable to effect the desired mixings. In fact, in the method of the present invention in its digital computer embodiment, the selector 20 and the mixer 58 may merge into one set of operations, whereas in the analog embodiment they are desirably kept separate. This is because the selector 20 may comprise simply a multiplicity of operational amplifiers whose outputs are either zero, plus-one, or minus-one, times their inputs, and it is easier to maintain the operational amplifiers that produce only those three values of gain than to maintain a multiplicity of amplifiers whose gain must vary in some arbitrary fashion with time. So in the analog version the arbitrary variation is advantageously produced by a single variable gain summing amplifier means whose relative gain can be varied with time in the manner previously described. In the digital form of the method, all channels within the "selector" may be confidently multiplied by any function of time and moveout, and the "mixer" need involve no variable multi-plication function.

Mathematically speaking, the foregoing procedures for carrying out the method of the present invention can be expressed by a series of equations employing a plurality of symbols, which further aid in understanding the present invention, to wit:

Definitions:
- $O(t,h)$ Original Traces — functions of time ($t$) and horizontal position ($h$).
- $R(t,\Delta t)$ Sonogram traces (Rieber sonogram) — functions of time ($t$) and moveout ($\Delta t$).
- $P(t,\Delta t)$ Picking functions, determined by event selection; has values 0 or 1.
- $D(t,\Delta t)$ Trace and trace-sign selection function, predetermined on geological-geophysical criteria; has values 0, ±1.
  (NOTE: P and D may be combined just after the Event Section Stage to yield $G(t,\Delta t) = P(t,\Delta t) \cdot D(t,\Delta t)$. G would then be a Gain Control function.)
- $S(t,h)$ Simulated Seismic traces.
- $M(t)$ Mix proportion of S to O $$M(t) = W_s(t)/W_o(t)$$

- $W_s(t)$ Weight applied to $S(t,h)$
- $W_o(t)$ Weight applied to $O(t,h)$
- $C(t,h)$ Combined trace Sonogramming:
Sonogramming a set of N traces, $O(t,h)$, to produce a set of K sonogram sectors $R(t,\Delta t)$ is expressed as $$R(t,\Delta t) = \frac{1}{N} \sum_h O(t - h\Delta t, h), \qquad (1)$$

where $\Delta t$ represents the dip or moveout between adjacent traces.

Event Selection:
The original and sonogram traces are subjected to an event selection process which yields a picking function, $P(t,\Delta t)$. This function has values 0 or 1 corresponding to rejection or selection respectively. The picked sonogram, $pR(t,\Delta t)$, is obtained by weighting the sonogram with $P(t,\Delta t)$, $$pR(t,\Delta t) = P(t,\Delta t) \cdot R(t,\Delta t). \qquad (2)$$

Trace and Trace-Sign Selection:
A predetermined trace, and trace-sign selection function, $D(t,\Delta t)$ having values such as 0, 1, −1, is then applied to yield $$dpR(t,\Delta t) = D(t,\Delta t) \cdot pR(t,\Delta t). \qquad (3)$$

Inverse Sonogramming:
This modified sonogram is then ready for conversion into a set of N simulated seismic traces, $S(t,h)$.

$$S(t,h) = \sum_{\Delta t} dpR(t + h\Delta t, \Delta t). \qquad (4)$$

Equation 4 may be considered to represent sonogramming of the picked, selected sonogram, or, equivalently, the superposition of K records each of which corresponds to a single $\Delta t$ and contain N time shifted waveforms of the form $dpR(t + h\Delta t, \Delta t)$.

Mixing:
In the final step we combine $S(t,h)$ with $O(t,h)$ to produce $C(t,h)$, the coherent, continuous combined set of traces. The combination is a simple mix except that we may wish to impose a certain mix ration function, $M(t)$, which would control the relative weights given $S(t,h)$ and $O(t,h)$ in the summation.

$$M(t) = W_s(t)/W_o(t) \qquad (5)$$

and, for normalization purposes, $$W_s(t) + W_o(t) = 1 \qquad (6)$$

so that $$W_o(t) = 1 - W_s(t) \qquad (7)$$

and, from 5, $$W_s(t) = M(t)/[1 + M(t)] \qquad (8)$$

the final set of traces then becomes $$C(t,h) = W_s(t) \cdot S(t,h) + W_o(t) \cdot O(t,h) \qquad (9)$$

Modifications:
As previously mentioned it is sometimes desirable to combine the picking and trace and trace-sign functions to produce an overall gain function $G(t,\Delta t)$ such as:

$$G(t,\Delta t) = D(t,\Delta t) \cdot P(t,\Delta t) \qquad (10)$$

Accordingly, Equation 3 supra can be modified to the following form:

$$dpR(t,\Delta t) = G(t,\Delta t) \cdot R(t,\Delta t) \qquad (11)$$

Similarly, it may be desirable to modify the mix ratio function, $M(t)$ by multiplying weighting factor $W_s(t)$ to Equation 3 to yield:

$$dpR(t,\Delta t) = D(t,\Delta t) \cdot pR(t,\Delta t) \cdot W_s(t) \qquad (12)$$

It should be more apparent from the mathematical expressions set forth above how various analog and digital modifications of the present invention can be carried out. For example, in mixing the inverse sonogram traces, the mixing ratio, $[M(t,\Delta t)]$, of Equations 5–9, can be applied as follows: (i) by a cam and rack-and-pinion arrangement in the manner of Equations 5–7; (ii) by amplification means in the manner of Equations 5, 8 and 9; or (iii) by operational amplifiers in the manner of Equation 12 (digital embodiment). Additional modifications may also be discernible from these expressions. For example, the selection of events within the sonogram traces can be combined with the trace selection function, by the provisions of an overall gain function $[G(t,\Delta t)]$ in the manner of Equation 11.

Figure 2:
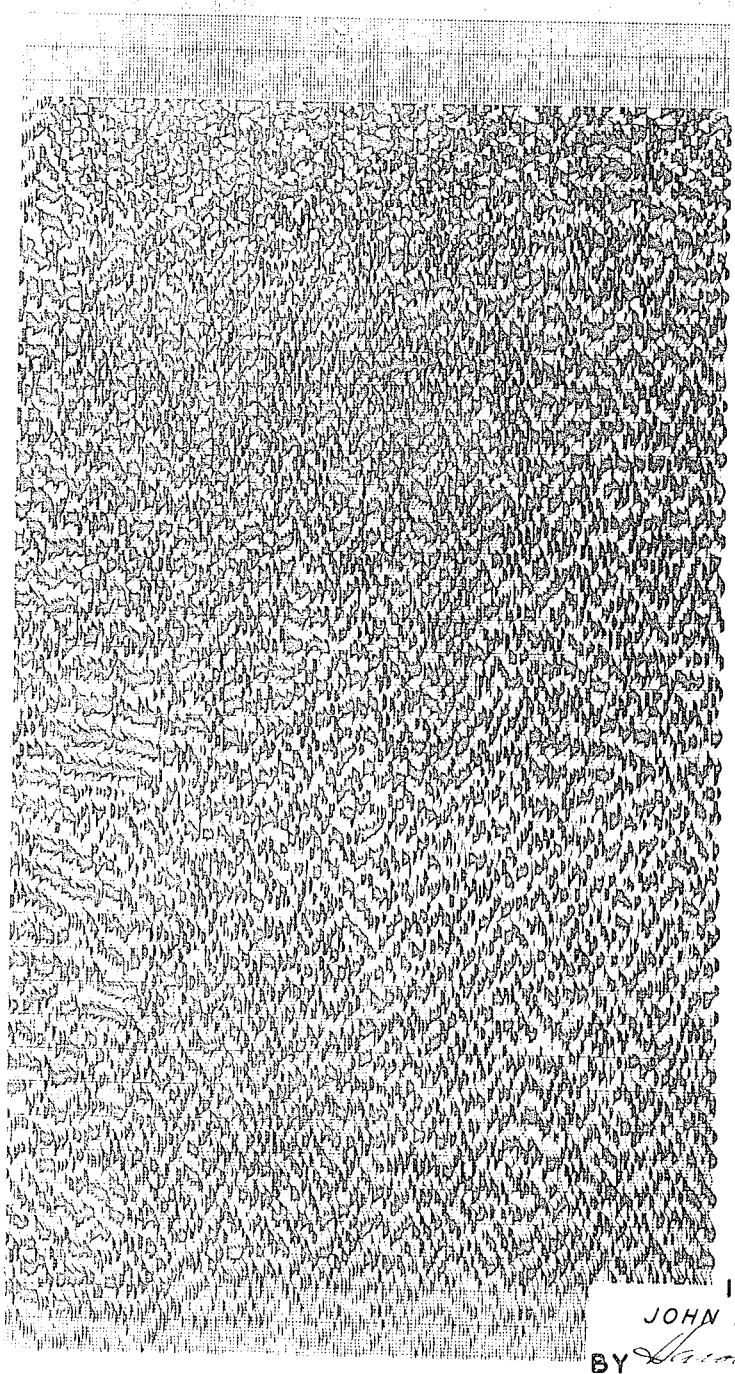
FIG. 2 is a portion of an actual multirecord seismic section.
Figure 3:
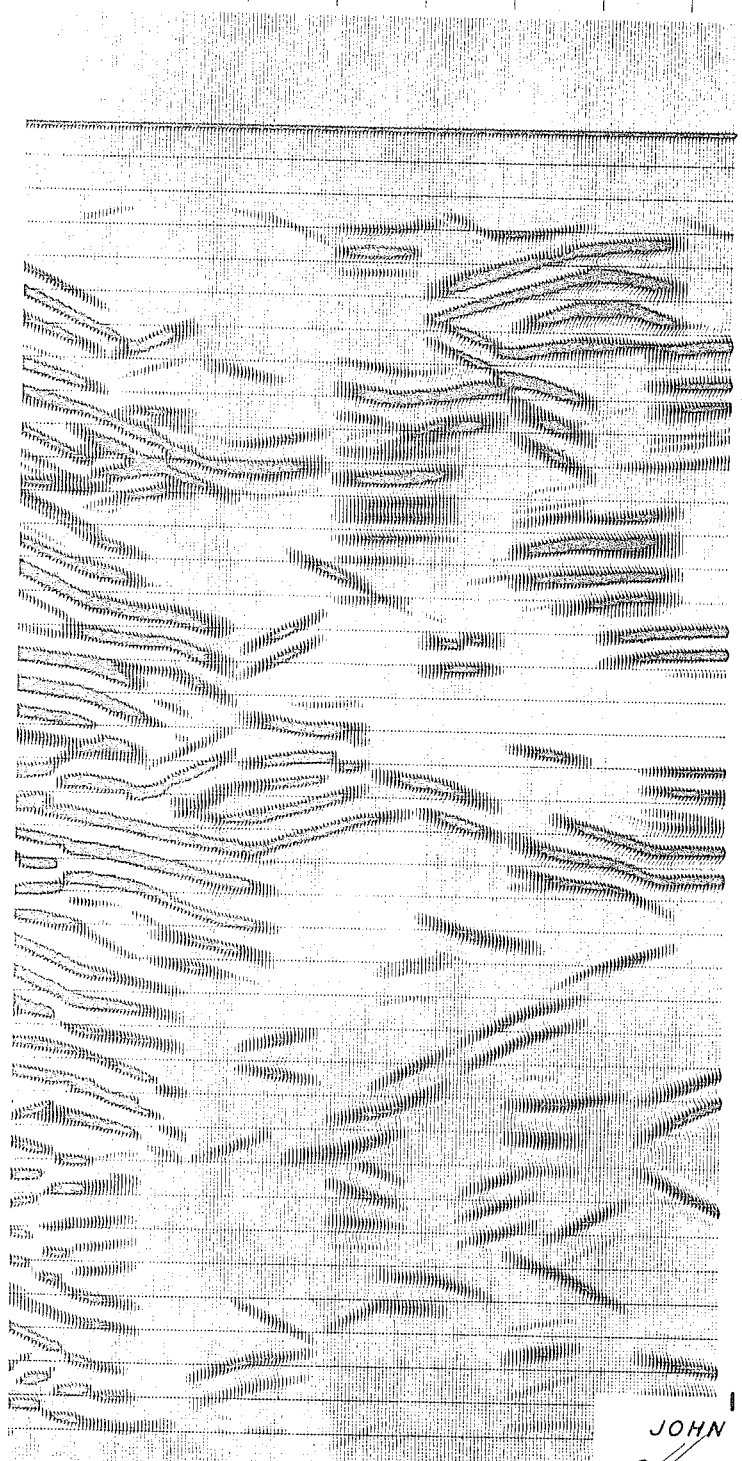
FIG. 3 is a portion of a simulated seismic section corresponding to the actual section of FIG. 2.
Figure 4:
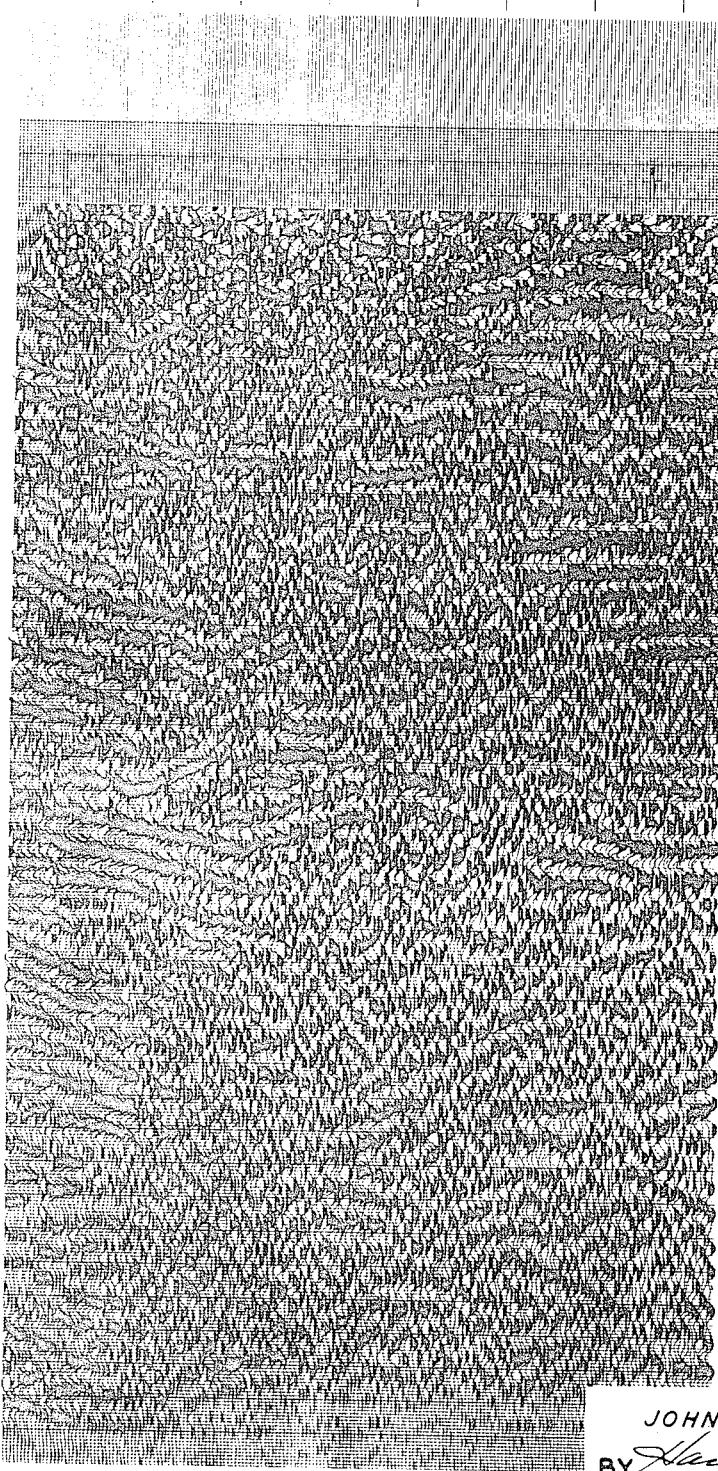
FIG. 4 is a combination of the sections of FIG. 2 and FIG. 3 produced in accordance with the method of the present invention.

FIGS. 2, 3 and 4 constitute a corrected field profile, its simulated profile and its enhanced profile product according to the method of the present invention. FIG. 2 is the original field profile of traces plotted in variable area and wiggle line form of the seismic reflections received at each geophone location along a seismic survey line. To an experienced seismologist the profile demonstrates a section that is difficult to interpret; it is said to have a poor signal-to-noise ratio probably because of noise superimposed upon what are believed to be the legitimate seismic reflections in the profile.

FIG. 3 is a simulated profile of the profile of FIG. 2. By the processes of event and dip selection the low dip signal alignments across the profile have been selected while those signals believed to be noise throughout the profile have been eliminated.

FIG. 4 is the combined record of FIGS. 2 and 3 showing the enhancement that is accomplished by the mixing of original and simulated seismic signals. Certain of the advantages of enhancement are apparent in the end product of FIG. 4. Also apparent in FIG. 4 are the uniformities of the original record of FIG. 2. Above and beyond the content of either FIG. 2 or FIG. 3 is the surprising continuity of events that can be followed in the combined record of FIG. 4. It should be further noted that there is an improvement in the "tying" of events from record to record within the profile of FIG. 4. Tying is the appearance of events across an entire profile that makes the trace excursions within all, and particularly adjacent traces, appear to represent subsurface formation contours. The theoretical improvement produced by FIG. 3 is combined with the actual field record produced in FIG. 2 to enhance the alignment of events from trace to trace across the entire profile.

Figures 5A, 5B:
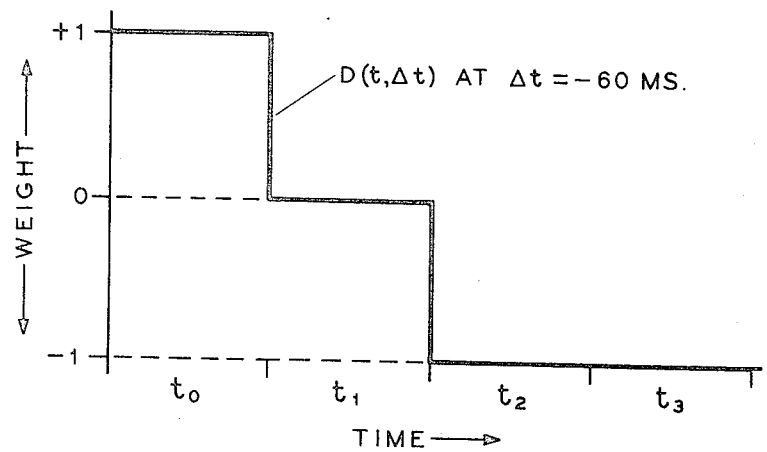
FIGS. 5a, 5b and 5c are graphs to illustrate moveout selection in accordance with the present invention.
Figure 5C:
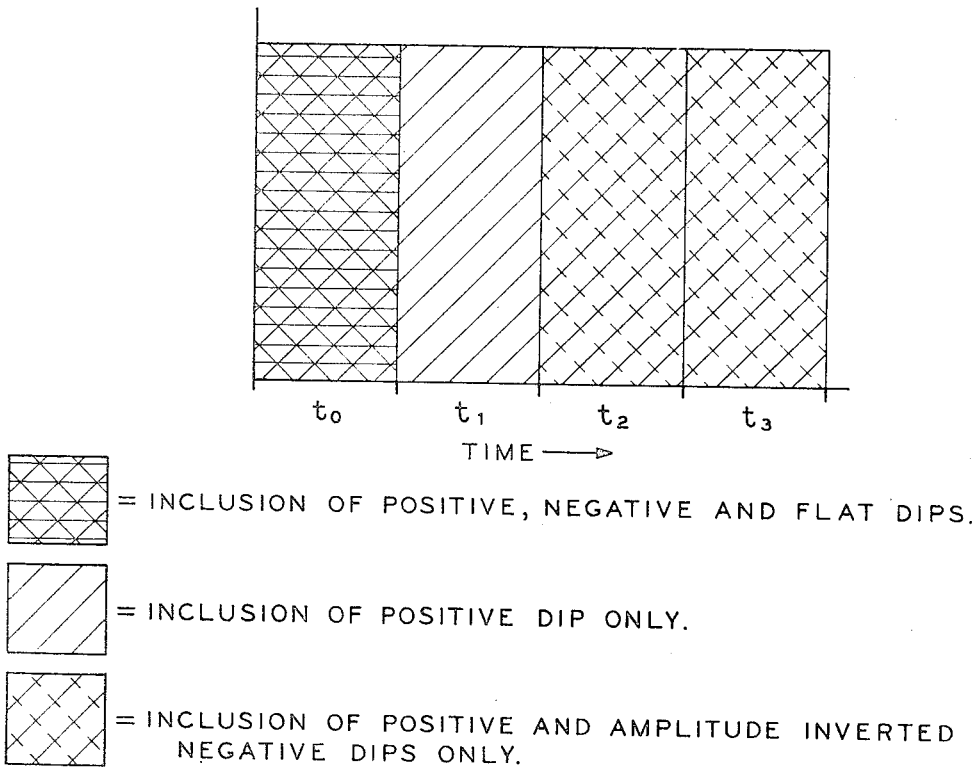

FIGS. 5a, 5b and 5c illustrate various moveout combinations that may be employed as a function of time utilizing trace selector 20. It should be recalled in the mathematical expressions which describe the operation of trace selector 20, namely, Equation (3) supra, that the sonogram traces $pR(t,\Delta t)$ are a function of two variables: time $(t)$ and moveout $(\Delta t)$. In the operation of trace selector 20, therefore, each selection function utilizing the trace selector 20 will be associated with the given trace position on record 36. FIG. 5a and FIG. 5b illustrating in detail the selection functions for three of many traces comprising record 36: the left-most trace, the center trace, as well as the right-most trace of that record. In these Figures, the selection function associated with each of these traces is designated in a manner corresponding to the record moveout of that trace and has a selected pattern of variation with time. The (−60) millisecond sonogram trace is provided in these Figures with a (−60) ms selection function. Similar symbolism is employed for the 0 and (+60) millisecond moveout traces. It should be further noted that the selection of the pattern of each of these selection functions is not an arbitrary decision. Among other things, the nature and structural complexities of the formation through which the seismic data has propagated determines the pattern of each function. If the formation under survey has included the following:

i. a series of shallow beds dipping, say, in a negative sense with respect to the geophone spread (negative dip), which in the field record are identified with amplitude variations having a common moveout of about (−60) milliseconds, ii. a series of deeper beds (oil bearing potential) dipping in a positive sense which in the field record are identified with moveouts of about (+60) milliseconds, and iii. an unconsolidated series of strata between (i) and (ii);

then the resulting field record could also have included a series of multiples of the seismic signals reflected from the shallow beds within the formation. These multiples, when received at the geophones, could have a time coincidence with the arrival of signals from the deeper beds so that the true structure of the oil bearing formation would be obscured. A seismologist, with a display of the unprocessed field record in his hands, say with only dynamic and static corrections applied thereto, is usually able to detect existence of the aforementioned multiple signals and thus can create a processing program utilizing trace selector 20 which suppresses the effect of such multiples.

FIG. 5a depicts selection function for the trace $\Delta t$ equals −60 milliseconds as a function of time to provide for such suppression. Note that the selection function commands initially inclusion of all signals at the moveout over the time increment of $t_o$ (i.e., the selection function equals +1); zero such signals over the time increment of $t_1$ (i.e., selection function equals 0); and amplitude inverts such signals of the time increments of $t_2$ and $t_3$ (i.e., selection function equals −1).

FIG. 5b depicts selection functions associated with the traces designated with 0 and +60 millisecond moveouts as well as the trace associated with a moveout of −60 milliseconds illustrated in detail in FIG. 5a. As indicated in FIG. 5b, over the initial time increment, $t_o$, the amplitude representations of all three traces individually undergo further processing. In this regard, attention should be directed to the fact that each trace is provided with a selection function of +1 at the trace selector 20. Over the next time increment, $t_1$, the traces associated with the flat and negatively dripping beds (0 and −60 millisecond traces) are suppressed utilizing a selection function of 0, i.e., selection function equals 0, since the seismologist in the example set forth above is only interested in identification of positively dipping beds. For obvious reasons, the +60 millisecond trace is provided with a selection function of +1 over that time increment. For similar reasons, over the remaining time increments of the record, $t_2$ and $t_3$, the +60 millisecond record is provided with a selection function of +1, while the 0 trace is provided with a selection function of 0. Note with particular care that in the above-identified later time stages that the −60 millisecond trace undergoes amplitude inversion since its selection function is provided with a value near −1. Thus, when amplitude inverted traces are later summed at summing amplifier 52 and mixed with the original traces at mixer 58, there will be complimentary addition of the amplitude representations of the mixed traces resulting in the suppression of multiples in the combined trace applied to tape 64. Furthermore, in a visual display of the data of tape 64, the signals from the deeper positioned dipping beds, i.e., the +60 millisecond sonogram traces, will be phase additive after mixing at mixer 58. Thus, not only is the final display provided with suppression of multiples in the manner discussed above, but, additionally, there is enhancement of seismic events of interest in both the continuity and coherency senses.

FIG. 5c illustrates the combination of the moveouts of the final combined record at tape 64 as provided by the selection functions depicted in FIG. 5b. In FIG. 5c, three cross-hatched patterns are illustrated as a function of the time increments, $t_o$, $t_1$, $t_2$ and $t_3$. Over the initial time increment, $t_o$, signals associated with negative, positive and flat dipping beds within the formation of interest are gated through the selector 20 for further processing. (In FIG. 5c, the negative sloping lines should be associated with the −60 millisecond trace from record 36, the horizontal lines associated with the 0 trace from record 36, and the positive sloping lines with the +60 millisecond trace from the record 36. Furthermore, the negative phantom lines appearing in FIG. 5c should be associated with the amplitude inverted −60 millisecond trace, from the record 36.) Over the time increment, $t_1$, only signals associated with positive dipping beds are gated through the trace selector 20 since the selection functions for the 0 and −60 millisecond traces from the record 36 are 0. While over the time increments $t_2$ and $t_3$ only signals associated with amplitude inverted trace (i.e., the −60 millisecond trace) as well as the +60 millisecond trace are gated through the selector for further processing in accordance with the procedures of the present invention.

Figure 6:
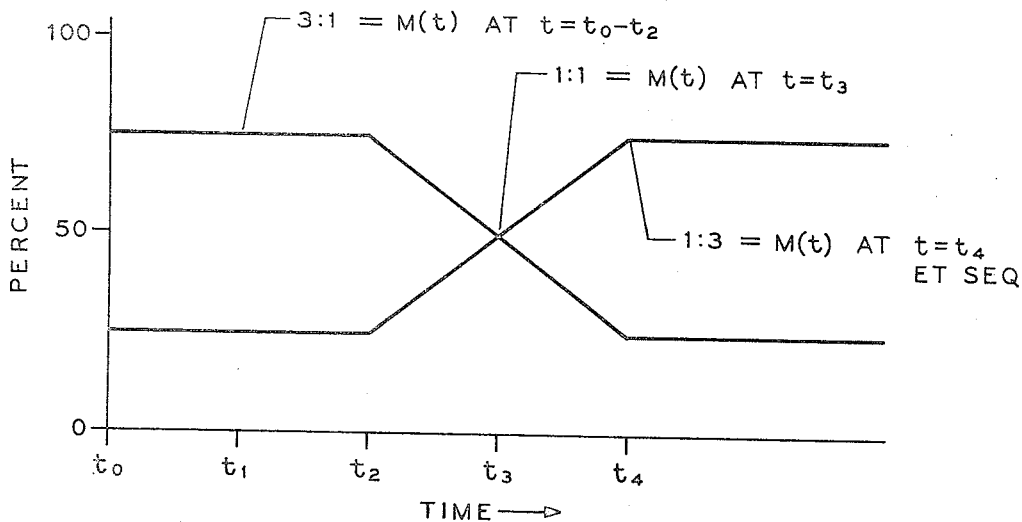
FIG. 6 is a graph illustrating time-varying mixing of the original section and the simulated section.

FIG. 6 illustrates the time variation that may be applied to the amplitude mixing of the simulated seismic trace and the original seismic record trace where initially the simulated trace is established as three times stronger than the original trace for the first third of the record. Along the middle of the record the original record trace is increased (linearly or nonlinearly) from its lower contribution to a higher contribution, in effect reversing the strength of the original record trace to three times that of the simulated record trace, and for the remainder of the record the mixture is an original record trace three times stronger than the simulated trace.

Further improvement in continuity and uniformity can be accomplished by overlapping the procedures used in the production of the simulated record. The basic, simple way to group traces of a seismic record is, of course, to let, say, traces 1 to 24 form the first group, traces 25 to 48 form the second group, traces 49 to 72 form the third group, etc. However, for the kind of overlapping intended here, one may let traces 1 to 24 form the first group, traces 13 to 36 form the second group, traces 25 to 48 form the third group, traces 37 to 60 form the fourth group, etc. In this way, each trace is used twice, first in a more leftward group and later in a more rightward group. If overlapping trace groups of this indicated sort are sonogrammed, and if the resulting sonogram traces, after picking, are sonogrammed again, the resulting simulated seismic traces will, of course, be increased in number in accordance with whatever overlapping was used.

Following along the example already mentioned, there will be two simulated seismic traces for each horizontal coordinate position of the original seismic section. In the overlapping modification of the present method, both of these traces can be, and are, used. A weighted mixture of the two traces is added to the corresponding original trace. The weighting factors are complementary in the sense that the two weights add up to unity, e.g., if the amplitudes on one trace are multiplied by 0.2, the amplitudes on the other are multiplied by 0.8. The complementary proportions are varied from one horizontal coordinate to the next, so that the effect of a set of simulated traces derived from a more leftward group of original traces changes gradually into the effect of a set of simulated traces derived from its overlapping more rightward group of original traces. For example, a set of twelve simulated seismic traces might be produced from twelve pairs of traces, one member of each pair being from a leftward group of original traces and the other member being from its overlapping rightward group, and the weights given to the members of the pairs of traces might be represented by the twelve member pairs: (1.000,0), (0.9090,0.0909), (0.8181,0.1818), (0.7272,0.2727), (0.6363,0.3636), (0.5454,0.4545), (0.4545,0.5454), (0.3636,0.6363), (0.2727,0.7272), (0.1818,0.8181), (0.0909,0.9090), (0,1.000).

It is evident that this type of overlapping operation makes the effect of a set of simulated traces derived from a more leftward group of original traces change gradually into the effect of a set of simulated traces derived from an overlapping more rightward group of original traces, and the resulting composite seismic section therefore shows further improved across-the-section continuity.

It should be noted that the invention described herein is particularly effective in accomplishing uniform processing of a number of separte records that make up a seismic profile. With the use of the method and apparatus herein described, it is possible to improve the useful content of a multitrace seismic cross-section by retaining all of the data that was present in the original field record while enhancing the signal representations within individual traces and improving continuity of coherent energy across the section.

The sonogramming and mixing process may be used to eliminate record displays of unwanted dip in the improved final profile. Having made a decision that certain trace-to-trace alignments of trace excursions represent a particular dip that is unwanted in the eventual final profile, it is not only possible to avoid enhancing alignments representing the unwanted dip, but also possible to subtract the suspected alignment from the record as displayed. The final profile produced in this manner retains those portions of the original record that display record correlations within a desired dip angle and may include enhancement of those events within a trace that show particular correlation. At the same time the process may exclude those portions of the original record outside of the desired dip angle and may also further attenuate and subtract the trace correlations along the dip angle to be excluded.

Figure 7:
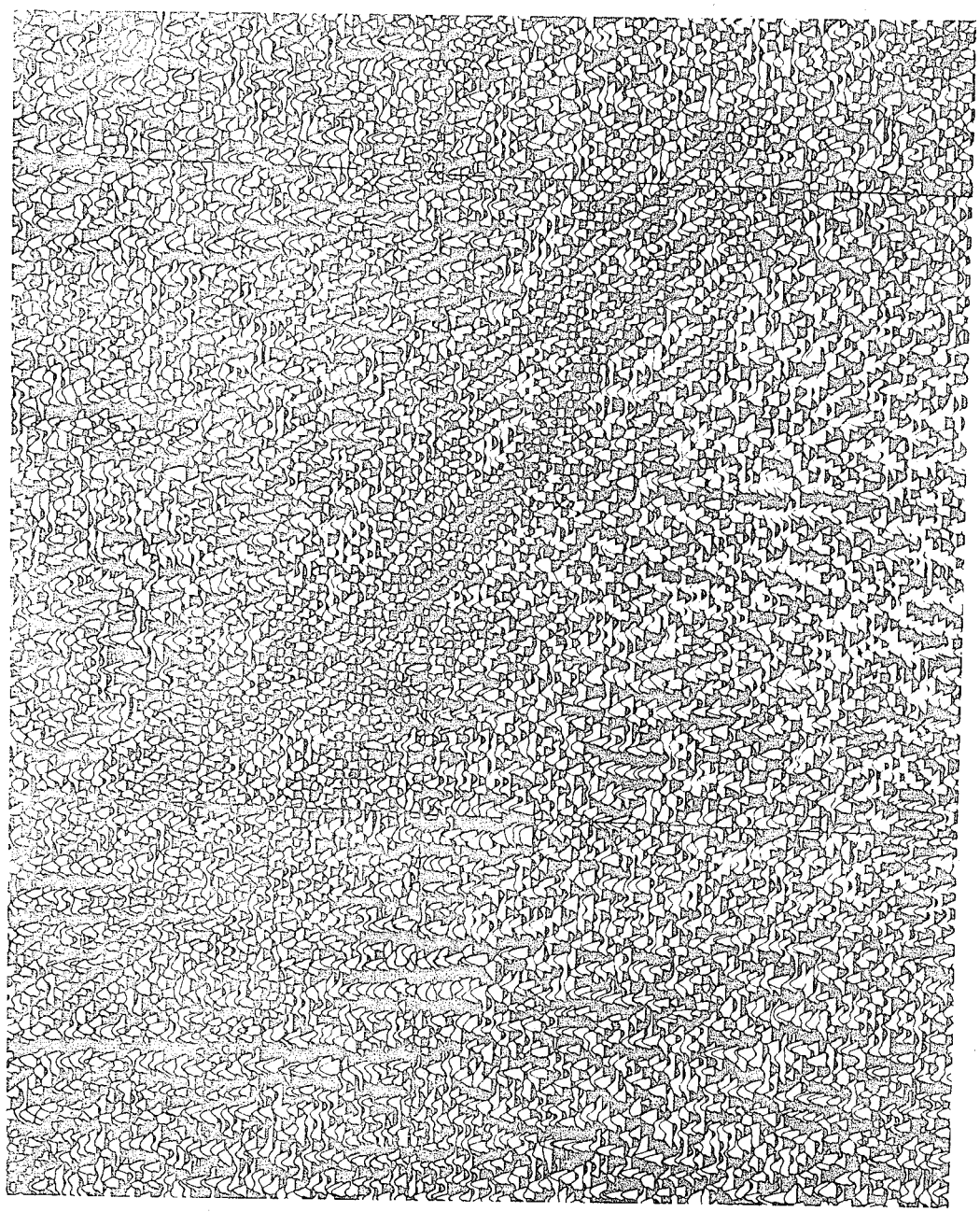
FIG. 7 is a portion of a corrected original record section illustrating an unwanted trace-to-trace coherence of steep dip overriding a desired coherent signal of almost no dip.
Figure 8:
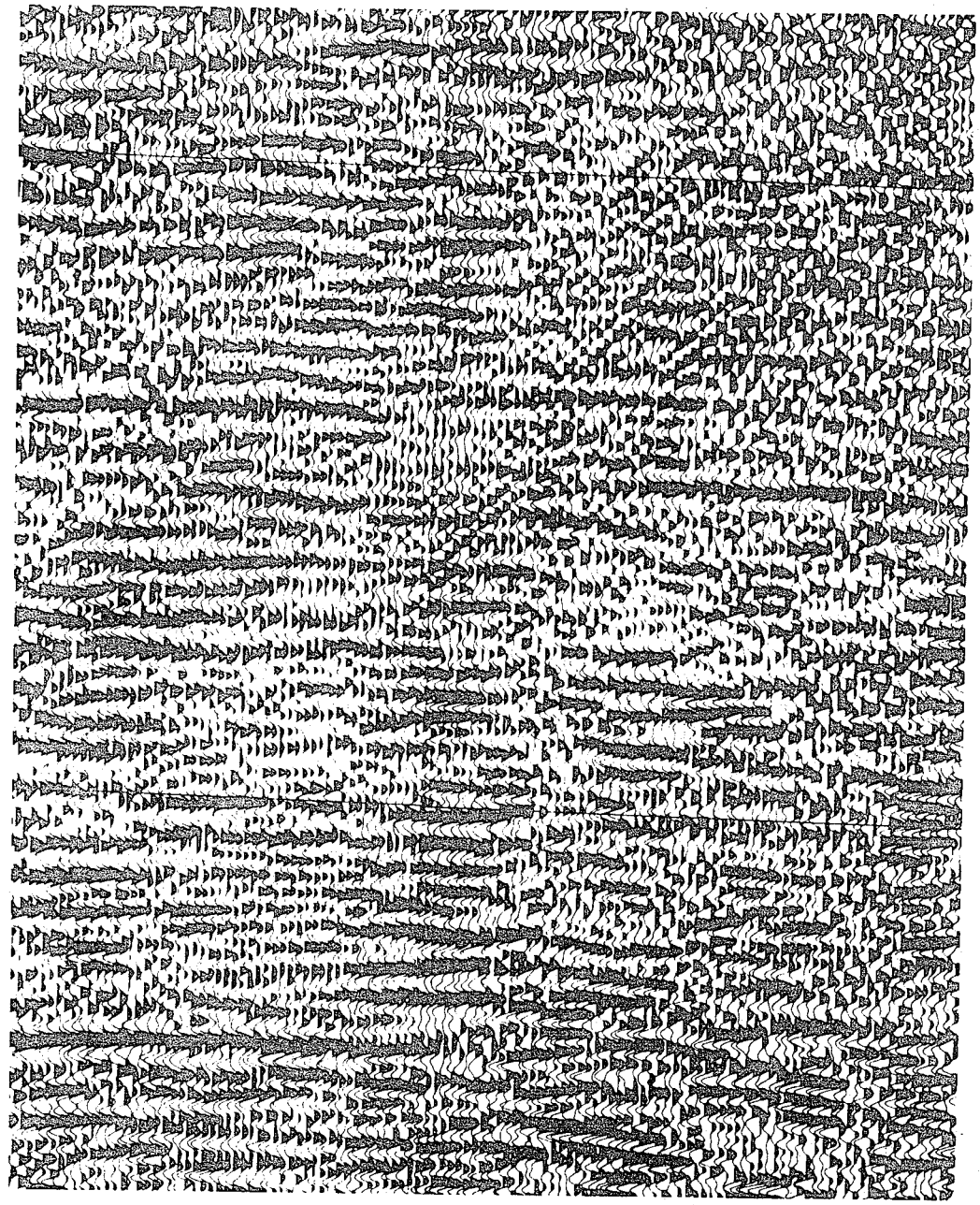
FIG. 8 is a portion of the composite record section derived from the record section of FIG. 7 and produced in accordance with the method of the present invention.

FIGS. 7 and 8 illustrate the application of some of the procedures just described. FIG. 7 is a portion of a corrected original record section illustrating unwanted coherent noise waves of steep dip overriding and almost obscuring the coherent signal having almost no dip. FIG. 8 is the same portion of the record section after the method of the present invention has been employed to eliminate the unwanted coherent noise of steep dip. The small remaining evidence of the steeply dipping noise waves no longer obscures the flat dip, wanted signal events. While not physically evident by comparison of FIGS. 7 and 8, the improvement accomplished by the processing applied was accomplished by subtracting those signals representing the steep dip. In this particular example, no enhancement processes were applied to the flat dip signals. By comparison, the improvement accomplished in processing the record of FIG. 2 to FIG. 4 was accomplished by enhancing the desired signal and mixing the enhanced signal with the original record signal.

Attention should be directed to the fact that the profile resulting from the abovementioned elimination combination could itself be reprocessed as an original record. This iterative procedure draws benefit from the ability to look more deeply into the data once the more obvious events have been deleted. For example, a section dominated by steeply dipping multiples or other undesired coherent energy may have underlying signal energy of different moveout but of such low energy relative to the coherent noise as to be subliminal to the eye and unpickable to the event selection system. After an initial determination and elimination of the high energy noise, the remaining data present on the combined section is suitable for iterative processing and successful selection of desired signal.

Figure 9A:
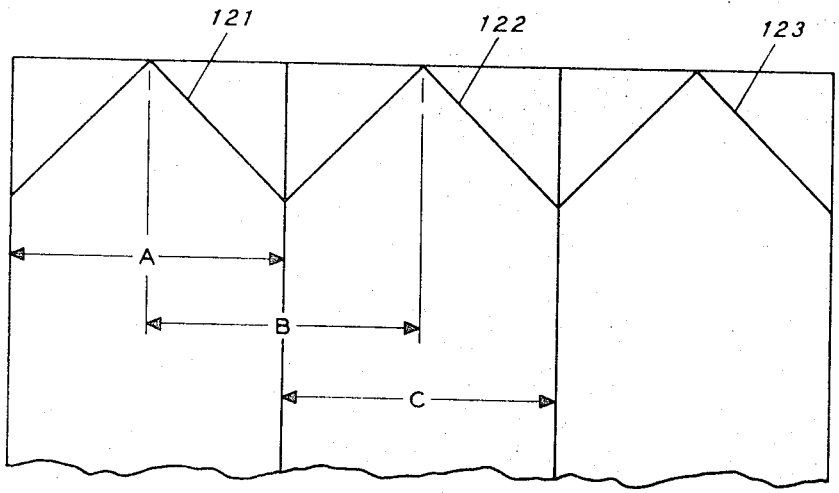
FIG. 9a is a schematic representation of a multirecord seismic section.
Figure 9B:
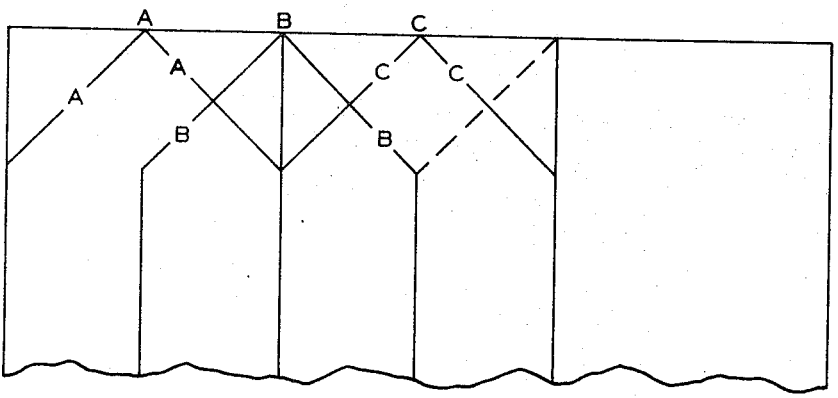
Figure 9C:
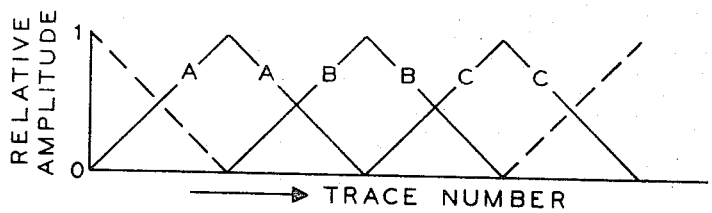
FIGS. 9c and 9d are graphic representations of possible weighted mixtures for the simulated record section of FIG. 9b to accomplish a tapered simulated record section.

FIGS. 9a, 9b and 9c illustrate possible combinations of original traces in the production of sonogram traces that eventually become combined to produce the simulated traces for mixing with the original record traces.

In FIG. 9a, a schematic representation is presented of a three record seismic section. Each of the records 121, 122 and 123 is illustrated as though it was produced from one source and recorded by one surface geophone spread. It will be evident to those skilled in the seismic data processing art that each of the records 121, 122 and 123 constitutes a multitrace record of side-by-side reproducible traces each representing the output from geophone detectors at a surface location. On FIG. 9a the brackets marked A, B and C represent possible traces that may be sonogrammed to produce, in the illustrated case, three separate sonogram records. In accordance with the process described in the foregoing specification, these three separate sonogram records may then be sonogrammed to produce the simulated record herein described.

FIG. 9b illustrates the overlapping simulated records that would be produced as the groups of traces A, B and C were sonogrammed and then sonogrammed again to produce overlapping simulated records. One single simulated record should then be produced from these overlapping traces.

Figure 9D:
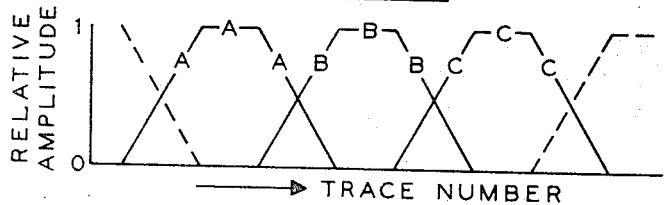

FIGS. 9c and 9d illustrate two of several alternative forms of weighting that might be applied in the production of the eventual simulated record. In FIG. 9c the weighting is varied linearly from zero to full strength and back to zero as the trace member is moving laterally across the record. FIG. 9d employs a maximum weight for the center traces of each of the simulated records and a tapering through a smaller overlapping portion. Other weighting combinations will be readily apparent from the two illustrated as well as other overlapping trace combinations in the production of the sonogram records.

By the method of the present invention a seismic section of seismic traces produced by recording, with respect to time, the movement of the earth's surface due to reflections of seismic energy is converted into an improved seismic section of seismic traces wherein machine correlation of coherent information is employed to enhance or modify the individual original traces so that the processed seismic section illustrates more easily interpretable seismic information.

In the foregoing specification an analog apparatus has been shown and described for performing the method of the present invention. It should be understood that the method can be performed on a suitably programmed digital computer and, for the purpose of accomplishing the results of the method at very high speed, the digital computer is the best mode contemplated by the inventor for carrying out the invention.

While certain preferred embodiments of the invention have been specifically disclosed, it should be understood that the invention is not limited thereto as many variations will be readily apparent to those skilled in the art. For example, previously-described method steps involving the transformation, modification and retransformation of values of amplitude-versus-horizontal coordinate-and-time of the original seismic traces (prior to proportionate mixing of the original and retransformed traces) themselves suggest alternative methods. Two-dimensional Fourier analysis may be particularly useful as an alternative processing method, for example, two-dimensional Fourier transforms —instead of sonograms— being formed, modified and retransformed prior to proportionate mixing with the original traces. Additionally, other integral transforms may be useful in this regard. However, in this type of two-dimensional transform, one of the variables should be related to the other variable in terms of moveout so that in the set of numbers constituting the entire transform, particular number subsets can be distinguished so that modification can be effected before they are associated with particular moveouts in the retransformed traces. Thus, the invention is to be given its broadest possible interpretation within the terms of the following claims.

What is claimed is:

1. A method of converting an original multitrace seismic section to a composite seismic section having both improved trace-to-trace coherence and improved across-the-section continuity, said composite seismic section being composed of said original section and a simulated seismic section, said original section consisting of a plurality of multitrace seismic records of amplitude-versus-horizontal coordinate-and-time seismic traces, each of said traces constituting energy derived from at least one seismic source and detected by at least one surface geophone and representing, in part, reflections from subsurface formations, and said simulated seismic section contituting a plurality of amplitude-versus-horizontal coordinate-and-time traces of seismic data at least some of which have undergone transformation modification and inverse transformation said conversion com-prising the steps of:

a. sonogramming said original traces, a group of traces at a time, to produce amplitude-versus moveout-and-time sonogram traces, each of said sonogram traces being identified by a respective horizontal coordinate associated with its sonogram pivot point and by its represented moveout,
   b. picking each of said sonogram traces to identify selected seismic data on the basis of selection codes that tend to assure authenticity that said data relates to reflection events of interest,
   c. sonogramming said picked sonogram traces to produce a plurality of simulated amplitude-versushorizontal coordinate-and-time seismic traces, and d. mixing, in time synchronism, amplitude representations of at least some of said original traces with amplitude representations of those of said simulated traces that have corresponding horizontal coordinates to produce a plurality of mixed traces comprising said composite seismic time section.

2. The method of claim 1 wherein Step *d* is further characterized by varying, in accordance with a predetermined function of time, relative mixing proportions of said original traces and said simulated traces.

3. The method of claim 1 in which at least one of said sonogram traces is omitted from the remainder of the method after the picking Step *b*.

4. The method of claim 3 in which the omission of traces is varied with time.

5. The method of claim 1 in which at least one of said sonogram traces is used with a negative sign in Steps *c* and *d* to effect a subtraction of information desired to be suppressed.

6. The method of claim 5 in which the negative sign is used during only part of the total record time.

7. The method of claim 1 in which said groups of traces in Step *a* overlap each other, and therefore some of the resulting said simulated seismic traces of Step *c* have the same said corresponding horizontal coordinates, and in Step *d* both members of the pairs of said simulated traces having the same said corresponding horizontal coordinates are mixed with said original traces having the same said horizontal coordinates, the mixing of said simulated traces being performed in complimentary proportions, changing from one horizontal coordinate to the next, so that the effect of a set of simulated traces derived from a more leftward group of original traces changes gradually into the effect of a set of simulated traces derived from an overlapping more rightward group of original traces, and the resulting composite seismic section therefore shows further improved across-the-section continuity.

8. A method of converting an original multitrace seismic section to a composite seismic section having both improved trace-to-trace coherence and improved across-the-section continuity, said composite seismic section being composed of said original section and a simulated seismic section, said original section consisting of a plurality of multitrace seismic records of amplitude-versus-horizontal coordinate-and-time seismic traces each of said traces constituting energy derived from at least one seismic source and detected by at least one surface geophone and representing, in part, reflections from subsurface formations, and said simulated seismic section constituting a plurality of amplitude-versus-horizontal coordinate-and-time traces of seismic data derived from said original seismic traces and selected on the basis of selection codes that tend to assure authenticity that the data relates to reflection events of interest at least some of said traces having undergone transformation modification and inverse transformation said conversion comprising the steps of:

a. transforming values of amplitude-versus-horizontal coordinate-and time within said original traces, a group of traces at a time, to produce directional values of amplitude-versus-moveout-and-time traces, each of said directional traces being identified by a respective horizontal coordinate and by a represented moveout, b. picking said directional traces to identify said selected seismic data, c. retransforming said picked directional values of amplitude-versus-moveout-and-time traces back into values of amplitude-versus-horizontal coordinate-and time to provide a plurality of simulated seismic traces, and d. mixing, in time synchronism, amplitude representations of at least some of said original traces with amplitude representations of those of said simulated traces that have corresponding horizontal coordinates to produce a plurality of mixed traces comprising said composite seismic time section.

9. The method of claim 5 including said plurality of mixed traces at least one of which having been aided by subtraction of the information desired to be suppressed, with the additional step of e. repeating Steps *a* – *d* for a second application of the method of the present invention so as to aid in the identification of relevant seismic data within the original traces, said relevant data meeting selection criteria of Step *b* during the second application but not necessarily during the first application of the method.

10. A method of converting an original multitrace seismic section to a composite seismic section having both improved trace-to-trace coherence and improved across-the-section continuity, said composite seismic section being composed of said original section and a simulated seismic section, said original section consisting of a plurality of multitrace seismic records of amplitude-versus-horizontal coordinate-and- time seismic traces, each of said traces constituting energy derived from at least one seismic source and detected by at least one surface geophone and representing, in part, reflections from subsurface formations, and said simulated seismic section constituting a plurality of amplitude-versus-time traces of selected seismic data at least some of which have undergone transformation modification, said conversion comprising the steps of:

a. computing from values of amplitude-versus-horizontal coordinate-and-time within said original traces, values of a two-dimensional transform of said first-mentioned values in a second domain in which at least one of the variables is related to moveout;

b. extracting from said last-mentioned transformation certain values which identify seismic data meeting specified selection codes that tend to assure that such values relate to seismic reflection events of interest;

c. inverse transforming said two-dimensional transform to produce values of amplitude-versus-horizontal coordinate-and-time forming said simulated seismic section;

d. mixing, in time synchronism amplitude representations of at least some of said original traces with amplitude representations of those of said simulated traces that have corresponding horizontal coordinates to produce a plurality of mixed traces comprising said composite seismic time section.

11. The method of claim 10 in which said two-dimensional transform computed from values of amplitude-versus-horizontal coordinate-and-time within said original traces, is a Fourier transform.

* * * * *